Aug. 21, 1934.   B. F. W. HEYER   1,970,889
BATTERY CHARGER
Filed Feb. 19, 1932   4 Sheets-Sheet 1
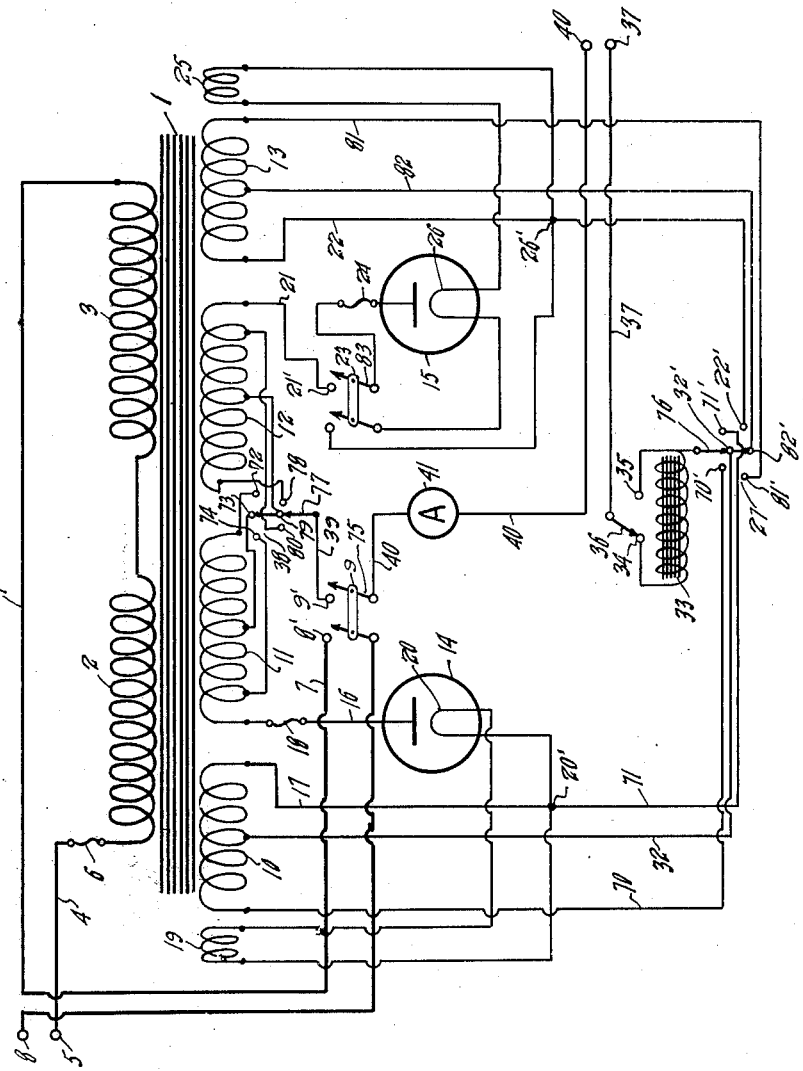
Inventor
BENJAMIN F. W. HEYER
By Semmes & Semmes
Attorneys

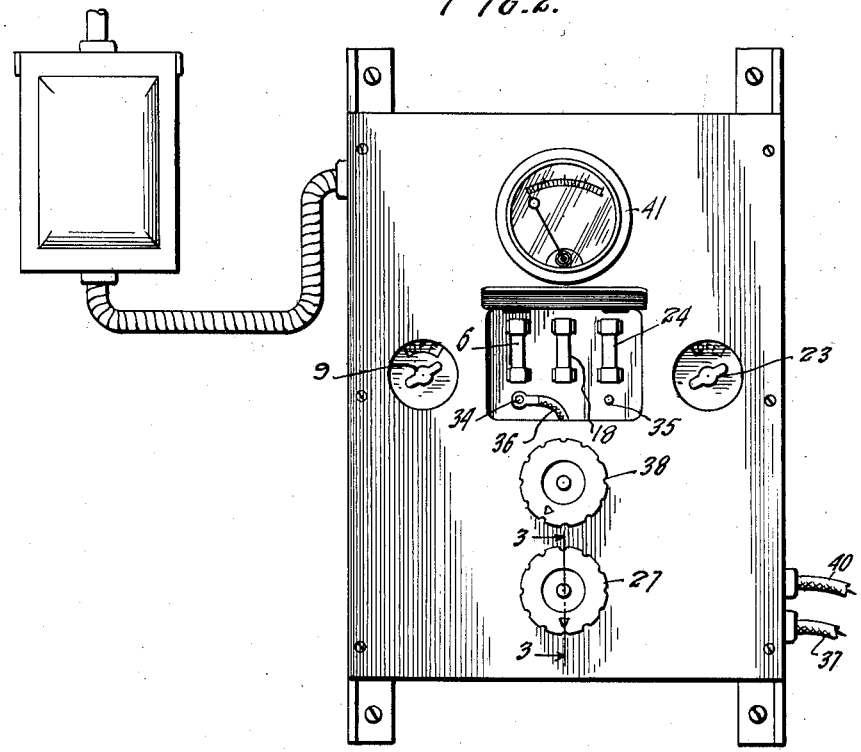
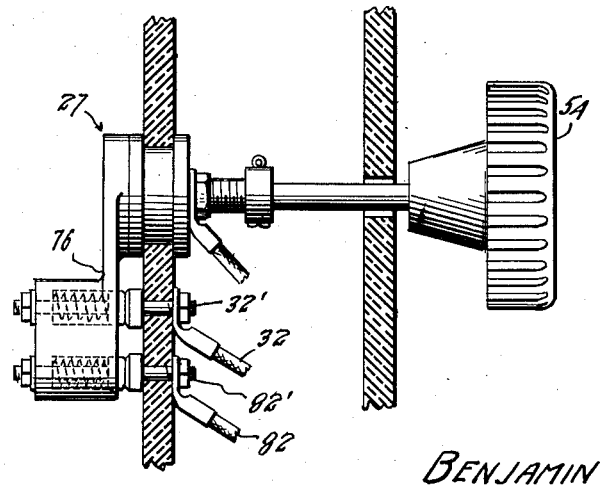

Aug. 21, 1934.  B. F. W. HEYER  1,970,889
BATTERY CHARGER
Filed Feb. 19, 1932   4 Sheets-Sheet 3
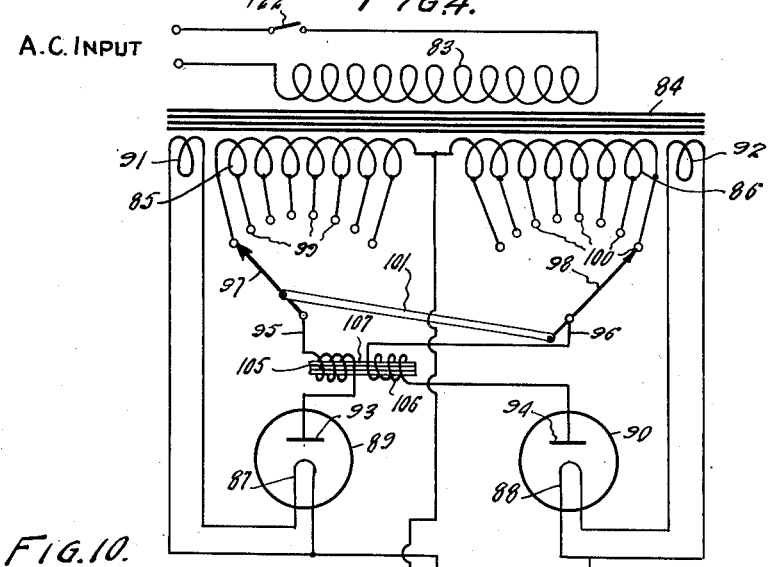
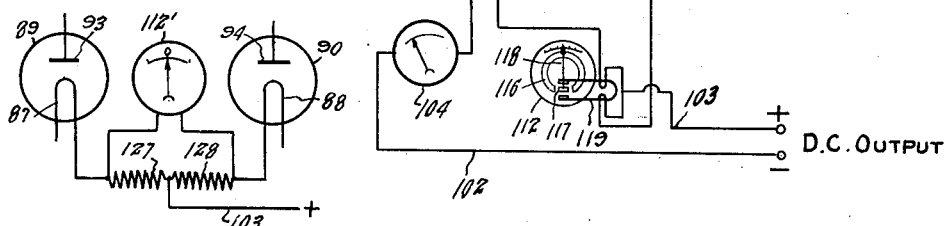
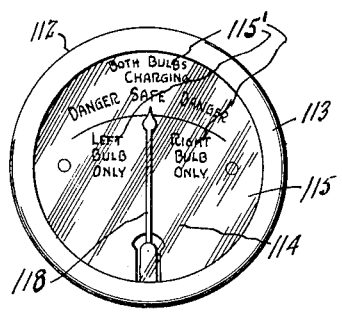
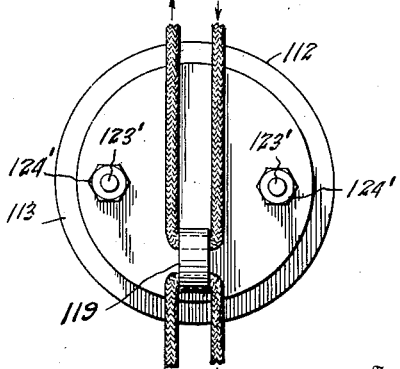
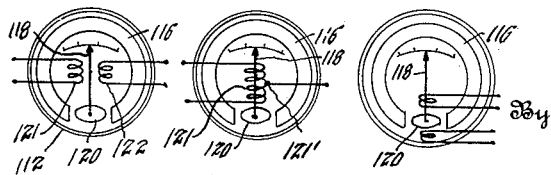

Aug. 21, 1934.  B. F. W. HEYER  1,970,889
BATTERY CHARGER
Filed Feb. 19, 1932  4 Sheets-Sheet 4
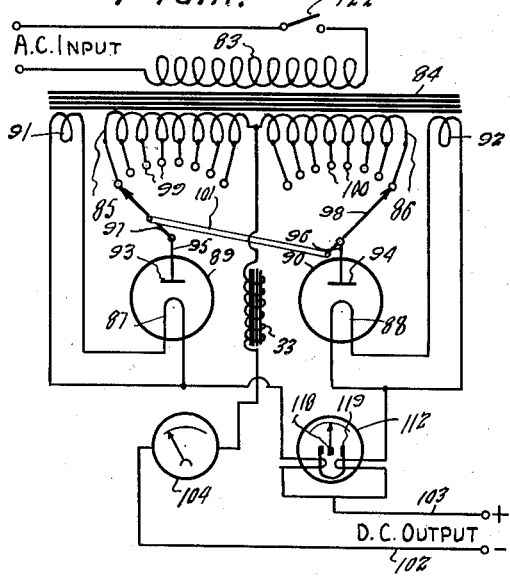
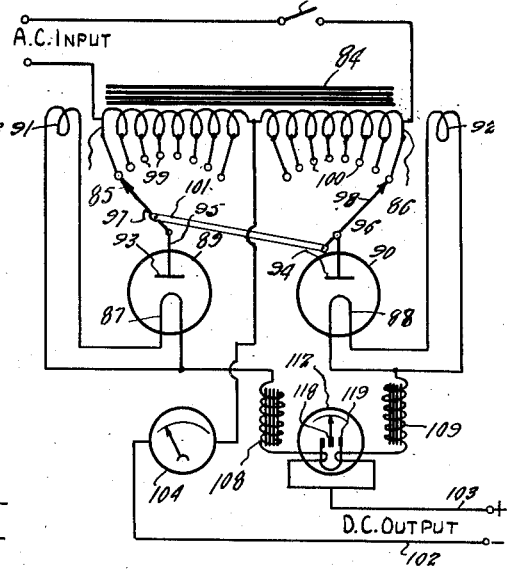
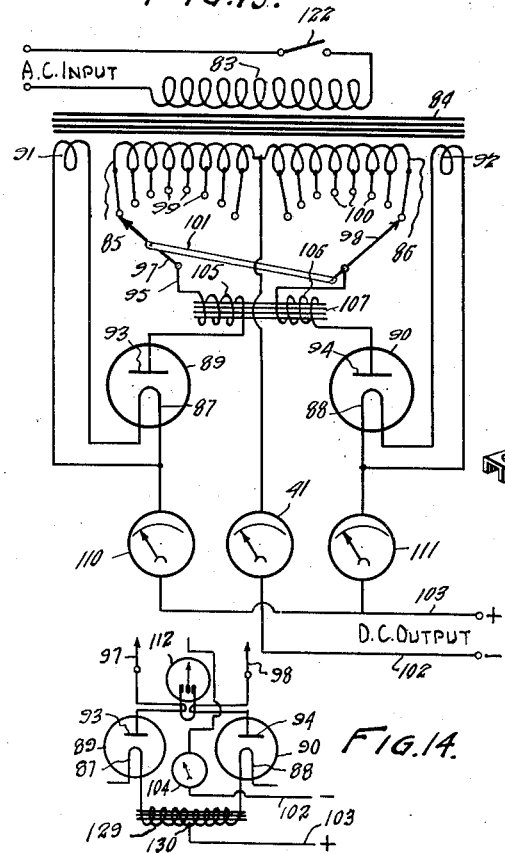
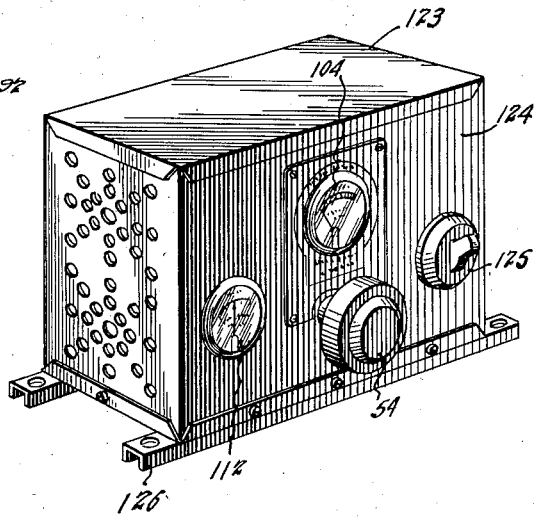
Inventor
BENJAMIN F. W. HEYER
By Semmes & Semmes
Attorneys Patented Aug. 21, 1934

1,970,889

UNITED STATES PATENT OFFICE

1,970,889

BATTERY CHARGER

Benjamin F. W. Heyer, Bloomfield, N. J.

Application February 19, 1932, Serial No. 594,403

17 Claims. (Cl. 175—363)

This application is a continuation in part of my copending application, Serial No. 87,552, filed February 11, 1926.

This invention relates in general to rectifying devices for providing a well balanced full wave direct current from an alternating current source, and more particularly to a battery charger.

It has heretofore been impracticable, requiring complicated and confusing arrangements, to employ a battery charger rectifying a full wave, as no satisfactory means has been provided for controlling the load on the rectifiers. Obviously in the rectification of a full wave it is essential to employ a plurality of rectifying tubes. In the absence of means for balancing a load thereon and the provision of a simultaneous control for a plurality of rectifying tubes, it has been necessary to employ single rectifier chargers, or two single charging units in one case, recognized as obviously inferior to a charger capable of full wave rectification.

An object of this invention is to provide a full wave rectification battery charging circuit having means for simultaneously impressing varying predetermined voltages on each rectifying tube.

Another object of this invention is to provide a full wave rectification battery charging circuit having means for balancing the current delivered to the rectifying tubes, to compensate for differences in the impedance of the rectifying tubes, or differences in the impressed voltage, or both.

Still another object of this invention is to provide a full wave rectification battery charging circuit having a single means in each of the rectifier tube circuits for balancing the current delivered thereto, to compensate for differences in the impedance thereof, or differences in the impressed voltage, or both.

A further object of this invention is to provide a device for indicating the operation of a plurality of rectifying tubes.

A still further object of this invention is to provide a plurality of reactances having magnetically associated cores.

With these and other objects in view which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawings means for carrying the same into practical effect, without limiting the improvements in their useful applications to the particular construction, which for the purpose of explanation, have been made the subject of illustration.

Where I refer to battery charging circuits in this specification, I do not intend to limit the utility of my system to this sole purpose, but it is my intention that my invention shall be used wherever balanced full wave rectified direct current supply is desirable.

In the drawings forming a part of this specification:

Figure 1 is a schematic diagram of the circuit.

Figure 2 is a front elevation of a case in which is enclosed the several units and circuit illustrated in Figure 1.

Figure 3 is a vertical sectional view taken on line 3—3 of Figure 2.

Figure 4 is a schematic view of the circuit with the device for indicating the operation of the rectifiers, the reactances with magnetically associated cores shown interposed therein.

Figure 5 is a front view of the indicator which I prefer to interpose in the circuit for showing the operation of the rectifiers.

Figure 6 is a rear view of the indicator showing the manner of the interposition thereof in the circuit.

Figures 7, 8 and 9 are diagrammatic views showing modified forms of indicator devices.

Figure 10 is a diagrammatic view of another form of indicating device.

Figure 11 is a diagrammatic view of a modified form of charging circuit.

Figure 12 is a diagrammatic view of still another modified form of charging circuit, employing an auto transformer.

Figure 13 is a diagrammatic view of still another modified form of charging circuit.

Figure 14 is a diagrammatic view of modified forms of reactances and a modified form of charging circuit adapted thereto.

Figure 15 is a perspective view of the instrument box for housing the apparatus.

In Figure 1 of the drawings, there is shown a diagrammatic representation of the circuit employed for connecting the rectifying means for both halves of the alternating current wave in a circuit such as a battery charging circuit. The circuit shown comprises a transformer 1 having two primary windings 2 and 3 serially connected, though one, or more than two, can be used. One end of the primary winding 2 is connected through a conduit 4 and a fuse 6 with a terminal 5.

One end of primary winding 3 is connected through a conduit 7 with a contact point 8' of a switch 9. A switch arm carried by the switch 9 is connected with a terminal 8. Terminals 5 and 8 are adapted to be connected to a suitable source of alternating current. In operation, the alternating current will flow in a circuit comprising the terminal 5, fuse 6, primary winding 2, primary winding 3, conduit 7, switch 9 and terminal 8.

Since the present invention proposes to rectify both halves of the wave, two rectifying devices in the form of thermionic tubes 14 and 15 are employed, though as far as the invention is concerned, any other form of rectifying means for both halves of the alternating current wave would be satisfactory. For the proper operation of the particular rectifying means shown, each thermionic tube is located in an individual circuit; consequently the secondary winding of the transformer 1 is divided so that a circuit is provided for each tube, so connected as to give full wave rectification.

Transformer 1 has a plurality of secondary windings 10, 11, 12 and 13, associated therewith and also secondary windings 19 and 25 adapted to supply current to filaments of the thermionic rectifying elements. As shown in Figure 1, each of the secondary windings 10, 11, 12 and 13 are tapped at intervals so that only desired portions of the windings may be used, the number of taps depending on design. For instance, winding 10 is connected by means of conduit 70 with switch point 70' and by conduit 71 with a switch point 71'. A conduit 32 connects a switch point 32' with the winding 10 at an intermediate point between its ends. Winding 10 is connected to a winding 19 which serves to heat filament 20 of the thermionic rectifying tube 14 by the connection 20'.

A conduit 16 connects the plate of the thermionic tube through a fuse 18 with one end of the secondary winding 11. The other end of the secondary winding 11 is connected with a switch point 72. Other switch points 73 and 74 are connected with conduits tapped to winding 11 whereby various portions of the secondary winding 11 may be used in the circuit.

The switch arm 77 of the switch 38 is adapted to selectively contact with either of the switch points 72, 73 and 74, and is connected through conduit 39 to a switch point 9' of the double arm switch 9. An ammeter 41 is connected by means of conduit 40 through switch arm 75 of the switch 9, adapted to contact with the switch point 9'. From the ammeter 41, a conduit 40 leads to a terminal 40' to which may be connected the load to be placed in the direct current output of the system.

A switch arm 76 of the switch element 27 is adapted to contact selectively with the switch points 70', 71' and 32'. From the switch arm of the switch 27, a conduit extends to a switch point 35 and also through an iron core reactance 33 to a switch point 34. A switch arm 36 is adapted to selectively contact with either of the switch points 34 and 35 to connect the terminal 37' through conduit 37 with the arm of the switch element 47.

When the switch device 9 is moved to the position whereby current will flow through the primary windings of the transformer 1, from the source of supply connected to terminals 5 and 8, and so that a connection is provided between the switch point 9' and the ammeter 41, current in the secondary windings of the transformer and the circuit associated therewith will flow as follows. There will be a current induced in the winding 19 of the secondary of the transformer which will heat the filament 20 of the thermionic tube 14. With the filament 20 heated, current may flow between the filament and the plate of the thermionic tube in substantially only one direction.

Under these conditions, we may assume that current in the circuit containing tube 14 will flow from the end of the winding 11 connected to contact point 72 through the winding 11 and fuse 18 to the plate of the thermionic tube 14. From the plate, the current will flow to the filament and thence to connection 20'.

If the arm 76 of the switch 27 is on contact 71', current will flow from connection 20' through conduit 71 to arm 76 of the switch 27 and thence to switch point 35 or through the iron core reactance 33 to switch point 34. Switch arm 36 is adapted to selectively connect conduit 37 with either of the switch points 34 or 35. Normally the current should flow through reactance 33 to conduit 37.

When a load such as a storage battery to be charged is connected to terminals 37' and 40', the current will flow from terminal 37' through the load to terminal 40', and thence through conduit 40 to the ammeter 41. From the ammeter, current will flow through switch arm 75 and conduit 39 to switch arm 77 of the switch 38. If the arm 77 is on switch point 73, the current will flow through approximately one-half of winding 11.

Of course, instead of the current flowing through the circuit just described, the switches 38 and 27 may be operated to cause the current to flow through greater portions of the windings 10 and 11, depending on load requirements. For instance, if the arm 76 of switch 27 is in the position shown in Figure 1, the current instead of flowing from the connection 20' through conduit 71, will flow through conduit 17 to the winding 10, and from the winding 10 through conduit 32 to contact point 32'. If the arm 76 is placed on switch point 70', current will flow from the connection 20' through conduit 17, through the entire winding 10 through conduit 70 to switch point 70'. It is also obvious that by moving the arm 77 of switch 38 to the various switch points 72, 73 and 74, various portions of the winding 11 may be placed in the circuit.

It will be appreciated that the potential imposed on the circuit containing the thermionic tube 14, may be varied by placing more of the windings 10 and 11 in the circuit, or the potential may be reduced by placing only portions of the windings 10 and 11 in the circuit. Winding 10 is tapped so that a small variation in potential may be obtained by varying the portions of the coil in the circuit, whereas winding 11 is tapped at larger intervals so that a greater potential difference exists between the tapped points, the arrangement of the taps and the location of the coils in relation to each other being a matter of design. Obviously, where additional adjustment given by winding 10 is not necessary, winding 10 may be eliminated entirely, as by connecting switch 29 to point 71'.

The circuit just described will serve satisfactorily to rectify one-half of an alternating current wave to produce a pulsating direct current. In order, however, to obtain the full benefit of the wave, that is, to rectify both halves of the wave, a second thermionic tube 15 is connected in a second circuit including the windings 12 and 13 of the secondary of the transformer 1. Winding 12 is symmetrical with winding 11 and is tapped at various portions similarly to the winding 11. The switch 38 is provided with a plurality of additional switch points 78, 79 and 80 with which the switch arm 77 is also adapted to contact.

It will be appreciated that with this construction, various portions of the winding 12 may be placed in the circuit as is the case of the winding 11 previously described. Similarly tapped positions on coils 11 and 12 are so connected to switch 38 that they are contacted simultaneously by switch arm 77 Arm 77 contacts either 74 and 80, or 73 and 79, or 72 and 78. Winding 13 corresponds to winding 10 and is tapped similarly to the winding 10. One end of this winding is connected by conduit 22 with switch point 22' and the other end is connected by conduit 81 with switch point 81'. The conduit 82 tapped from an intermediate portion of the winding 13 is connected with switch point 82' of the switch 27. Switch arm 76 of the switch 27 is adapted to contact with the switch points 22', 82' and 81' at the same time it contacts with the switch points 71', 32' and 70', respectively.

The filament 26 of the thermionic tube 15 is connected through one blade of a double bladed switch 23 with a winding 25 on the secondary of transformer 1, which serves to supply the filament with sufficient current to maintain it at the proper operating temperature. In operation, the circuit including windings 12 and 13 and the thermionic tube 15 will have current flowing through it as follows. Current induced in the winding 12 or any portion thereof will flow through conduit 21 to switch point 21', then through blade 83 of the switch 23, through fuse 24 to the plate of the thermionic tube 15. The current will then flow from the plate to the filament 26, and thence to the connection 26'. If the arm 76 of switch 27 is positioned so as to contact with switch points 71' and 22', the current will flow from the connection 26' to switch point 22', through arm 76 and preferably through the reactance 33 to the switch arm 36. From the arm 36, the current will flow through conduit 37 to the terminal 37'.

If a load such as a storage battery is connected with terminals 37' and 40', current will flow through the load to terminal 40', through conduit 40 to ammeter 41. Current will then flow from the ammeter 41 through conduit 40, through switch arm 75 to switch arm 77. Depending upon the position of the switch arm 77, current will flow through any desired portion of the winding 12, thereby impressing a predetermined voltage upon the circuit.

As described in connection with the windings 10 and 11, the windings 12 and 13 may have various portions cut out of the circuit by means of the switches 27 and 38. In order to properly balance the flow of current equally through the tubes 14 and 15, the windings 10 and 13 are so connected with the switch points of the switch 27 that a definite equal voltage will be impressed upon each of the circuits containing the windings 10 and 13, respectively, independent of the position of the switch arm 76. For instance, when the switch arm is on the contact points 22' and 71', no current will flow through the windings 10 and 13. However, when the arm 76 is on contact points 32' and 82', current will flow through approximately one-half of each of the windings 10 and 13. In order to place the entire winding 10 in its circuit and the entire winding 13 in its circuit, the arm 76 is shifted so as to contact with the switch points 70' and 81'.

Windings 11 and 12 are connected with switch points of switch 38 similar to the manner in which the windings 10 and 13 are connected to the switch points of switch 27. For instance, when it is desired that the current flow through each of the entire windings 10 and 12, arm 77 is moved so as to contact with switch points 72 and 78. In this instance, current flowing from the switch arm 77 to either of the plates of the tubes 14 and 15 will have to flow through the entire windings 11 and 12, respectively. If, however, it is desired to employ only a portion of the windings 11 and 12, the arm 77 may be moved to contact with switch points 73 and 79. In this instance, current will flow through approximately one half of the windings 11 and 12. If a still smaller potential is desired, the arm 77 may be moved to contact with points 74 and 80, in which instance, only a small portion of the windings 11 and 12 will be placed in the circuit.

Switch 27 is shown in Figure 3 of the drawings, in which its construction may be more readily understood. Its construction consists essentially of a single arm movable by a knob 54, which arm is adapted to contact with two rows of switch points. Switch 38 is constructed identically with the structure shown in Figure 3.

With the thermionic tubes connected in the circuits as described, the full wave of the alternating current will be rectified.

It will be noted that the secondary windings are so connected with the switch points of the switches 27 and 38 that the voltages impressed on the two thermionic tube circuits are equal within accepted commercial practice, regardless of the position of the switch arms 76 and 77. The current through each rectifier circuit for each of the tubes 14 and 15, however, may not be the same, owing to the variation of impedance of the rectifying devices and circuits resulting in one circuit permitting a higher current to flow therethrough than the other circuit.

Because of commercial limitations, all rectifying devices, even when new, will vary in impedance, but even more important, as units age, they tend to change in impedance during the life of the unit. If one unit fails first and is replaced, there may be a relatively large difference in impedance between the units. The unit with the lower impedance will tend to rectify the larger proportion of current.

The simultaneous adjustment of the secondary transformer coils 11 and 12, and 10 and 13 by switches 38 and 29, respectively, is of great advantage in simplicity of operation, but because of this very simplicity of simultaneous adjustment, the operator cannot compensate for difference in impedance of rectifier units, by independently adjusting the tapped connections to the secondary of a particular rectifying unit, and in that way changing the impressed voltage on a rectifier unit with a corresponding change in the current flowing in the circuit.

I have found that in order to prevent the flow of a higher current to one rectifying circuit than in the other, it is necessary to insert a reactance unit common to both circuits.

The reactance 33 has the effect of balancing the full wave rectified current. Without the reactance, if one rectifying unit had less impedance than the other rectifying unit, the one of less impedance would give pulses of direct current of greater amplitude than the pulses of direct current coming through the unit of greater impedance. It is desirable that the pulses of direct current from both units be balanced, or as nearly equal as possible.

The reactance 33 tends to balance the pulses of direct current from both the rectifier units. Let us assume that the circuit in which rectifier unit 14 is located, is of less impedance than the circuit including the rectifier unit 15. The current coming from the circuit including the unit 14, will induce a flux in the iron core in reactance 33 to a higher degree for each pulsation coming through the circuit including unit 14, than will be the case with the pulsations coming through the circuit including unit 15. The higher the flux density of the iron core in reactance 33, the more easily current will pass through the reactance. The circuit including unit 14 builds up a high flux in the iron core in reactance 33, making it easy for the weaker pulsations coming through the circuit including unit 15, to pass on their way to the output terminals of the system.

Because the pulsations coming through the unit 15, are relatively weak, the flux density of the iron core in reactance 33 is somewhat diminished from its condition after the pulsations received through the circuit including the unit 14. This relatively low flux offers more impedance to the pulsation coming from the circuit including unit 14, in effect, making it harder for the current from circuit 14 to get to the output terminals, and in the manner indicated making the path for the current coming from the circuit, including unit 15, an easier one for the succeeding pulsation coming through that last mentioned circuit. Thus, in effect the strong pulsations through the rectifier circuit of relatively low impedance, make easy the path of the pulsations from the rectifier circuit of high impedance, while that of high impedance, with its relatively weak pulsations, makes the path for the next succeeding strong pulsation a difficult one.

The reactance 33 is not used as a filter in any sense, and if it is made of large enough value to operate as a filter, it loses its effectiveness in balancing the full wave current, which is the result sought.

It is quite easy to design the reactance to compensate for any commercial degrees of variation in impedance in the rectifying circuits; for instance, a variation of twenty percent between the output of any thermionic tubes, which is often found in practice, can be, by this system, reduced to a difference of three percent at the output terminals of the system.

The various units and the circuit above described are enclosed within a suitable case 42 connected to a switch box 43, in which connection is made with the alternating current supply. A panel 44 is mounted in the case 42 adjacent to and parallel with the front plate. Mounted in the panel 44 are the control switches 27 and 38, and the arcuate rows of contact points 28 and 29, through which connection is made with the taps on the secondary windings.

While the charging unit described provides for the efficient full wave rectification of alternating current for charging storage batteries, I find that certain changes may be made therein for improving its efficiency from the operating standpoint, with particular reference to the reactance 33 and the ammeter 41.

In Figure 4 is shown a diagrammatic view of the circuit which I prefer to employ. This circuit comprises in the same manner as that already described, excepting the elimination of the stage switches, an alternating current input through the primary coil 83 of a transformer having a core 84 and serially connected secondary windings 85 and 86. The filaments 87 and 88 of a pair of rectifier tubes 89 and 90 are heated by secondary windings 91 and 92, respectively.

The plates 93 and 94 of the tubes are connected through conduits 95 and 96 and switch arms 97 and 98 to the secondary coils 85 and 86 through taps 99 and 100, respectively, on the secondary windings.

The switch arms 97 and 98 are adapted to move together electrically united as indicated by the conductor connector 101. The switch may be of the type shown in Figure 3 which will operate as a double switch. If insulated switches are used, they may be suitably connected together. The direct current output, like in the circuit already described, is through a conduit 102, intermediate the secondary windings, and a conduit 103 from the filament circuits of the tubes.

Thus far described, the circuit is substantially the same as that shown in Figure 1 as far as its essential features are concerned. In a similar manner I interpose an ammeter 104 in the circuit 102. This ammeter like that shown in the first circuit is adapted to register the total output from both tubes.

Different from the circuit first described in place of the reactance 33 shown interposed in the direct current output conduit from the secondary winding on the transformer, or the similar circuit shown in Figure 10, I propose to substitute a reactance in the circuits of both tubes, for example, in the conduits 95 and 96 in the plate circuits, such for example, as is shown in Figures 4 and 12, each comprising separate windings 105 and 106 on a common core 107.

Where a single reactance is employed, such as has been described in Figure 1, or as is also shown in Figure 10, the current from each bulb alternately acts on the core which provides a balance in the current by automatically varying the impedance to each pulse of current inversely to its intensity, this impedance change effecting the following pulse from the other tube.

A reactance may be placed in both the tube circuits as is shown in Figure 11 at 108 and 109. Where two reactances are used, however, in accordance with the preferred form of my invention, I employ two separate windings on a common core or magnetically associated cores such as is shown in the circuit in Figure 4. In employing impedances of this character, the coils must buck each other so as to completely reverse the flux in the common core at each successive pulse of current.

The balancing characteristics of the two windings on a common core are the same as that in which a single reactance is employed. The employment of these forms of reactances has the advantage, however, that it is equally effective with approximately sixty percent of copper and iron as the single reactance, and thus is less expensive and further desirably provides for a more compact unit. Manifestly, the construction may be varied and the same results achieved. As already inferred, instead of a common core, separate electrically connected cores may be employed as it is only necessary for the cores to be magnetically associated. Also, only a single coil may be used and this tapped, as shown in Figure 14, and the same result obtained.

If a single impedance is employed, the same should be placed in the output conduit from the secondary winding on the transformer, or if two impedances are employed, either with separate or a common core, the same may be interposed either in the plate or filament circuits of the tubes. For the test operation in the latter construction the impedances should have the same electrical characteristics so that the flux produced in one coil will be produced in the core in the opposite direction to the flux produced in the other coil.

In Figure 11 is shown a circuit differing from those already described, inasmuch as an auto transformer is shown incorporated therein. An auto transformer may similarly be substituted in any of the other circuits if found desirable except that in the use of a transformer of this type it is necessary for the switch heads to be insulated from one another. The switch arms 97 and 98 shown in this figure are therefore insulated from one another, the connector 101 being a non-conductor.

Referring again to the circuit illustrated in Figure 1, there is shown an ammeter 41. This is adapted to indicate the total output of the two tubes. Manifestly, this does not provide for indicating separately the output of a single tube, or in the event that one tube decreases in output or becomes inoperaive, which tube is defective.

This disadvantage may be corrected by placing ammeters 110 and 111 in the tube circuits, either the plate or filament, as shown in Figure 13. These two ammeters will indicate the output of each tube separately, but it is of course necessary to add the output registered by each in order to determine the total output of both tubes. This difficulty may of course be overcome by inserting the ammeter 41 in the direct current output conduit from the secondary winding, in addition, adapted to register the total output of the tubes.

While these three ammeters provide for determining the output of the separate tubes as well as the total output of both, it is confusing and cosly to incorporate these meters in the circuit.

I propose, therefore, in my preferred circuit as shown in Figure 4, and as also shown in Figures 11 and 12, to substitute for the two ammeters 110 and 111 a single meter 112 adapted to be interposed in the tube circuits either the plate or filament, and to indicate whether or not both tubes are operating and in the event one is not, which tube is inoperative.

The preferred form of indicating instrument, illustrated in Figure 4 as 112, may be enclosed in a conventional casing 113 as shown in Figures 5, 6, having a glass front piece 114 and a dial face 115. Suitable indicia 116 are imprinted on the face of the dial for indicating whether or not both rectifier tubes are operating.

The preferred form of indicating instrument comprises a permanent magnet 116 adapted to have an armature 117 fixed on the lower end of a pivoted pointer 118, fitted between the poles thereof, the action of the magnet on the armature being to normally maintain the pointer in a central position. The armature 117 is further adapted to lie between the open ends of a yoke 119. The yoke 119 as shown in Figure 6 extends out from the rear of the casing 112 and is adapted to have the conduit from the filament circuits of the tubes, or the plate circuits, oppositely extended therethrough. The conduits oppositely extended through the yoke according to the direction of current flow therethrough may be thus coiled one or more times around the arms thereof, if found desirable.

Current passing through either one of the leads is adapted to attract the pointer through energization of the yoke 119. When current is passing through both of the leads in opposite directions in the normal operation of the rectifiers, the action of the same will be neutralized so that the attraction on the pointer will be equalized, causing the pointer to remain in the normal stationary central position. Upon the operation of either one of the rectifiers becoming discontinued, causing the current to cease to flow in the circuit in which it is interposed, the current in the other circuit actuates the pointer through energization of the yoke to indicate that the other rectifying tube is inoperative. If both the rectifiers should become inoperative, such a condition can of course be ascertained from the ammeter 104.

In Figures 7, 8 and 9 are shown modified forms of meters which may be found susceptible of utilization in place of that described. These consist essentially of a standard type meter altered to provide for indicating the operation of a plurality of bulb rectifiers in the same manner as the meter 112.

Each of these meters like the meter 112 comprises a permanent magnet 116 and a pivoted pointer 118. In each meter a soft iron vane 120 is fixed on the lower end of the pointer 118 between the poles of the magnet.

In the meter shown in Figure 7, in addition to a fixed coil 121 found on a standard meter, a similar oppositely wound coil 122 is provided, the ends of both coils being adapted to be interposed in the plate or filament circuits of the tubes in the same manner as described with reference to the conduit passed through the yoke 119 on the meter 112.

When both bulbs are operating, the current passed through the coils 121 and 122 is adapted to maintain the pointer in a central position and with the operation of one bulb discontinuing and causing current to cease to flow through one coil, the current flowing through the other coil is adapted to indicate the inoperativeness of the other tube by actuation of the pointer.

The coil 121 may be tapped and the coil 122 eliminated as shown in Figure 8 and the same results with a simpler mechanical construction obtained on the coil 122 as shown in Figure 9, placed below the vane and a like effect achieved.

A moving coil dynamometer type of meter may be similarly adapted to use for indicating the operation of a pair of rectifying tubes in the same manner, if found desirable.

It will be understood as already stated that the action of one tube on the indicator pointer is always opposite to the action of the other. This is accomplished as has been pointed out, by the proper connection of the leads to the indicator so that the same are oppositely connected according to the direction of the current flow therethrough.

In Figure 10 is shown a different form of indicating arrangement consisting of a conventional ammeter 112' connected across a shunt comprising resistance units 127 and 128 centrally tapped by the positive output lead 103. In this device the voltage drop across each resistance in the normal operation of the circuit is adapted to be the same so that the equal but opposite attraction on the pointer will cause the same to remain in a central position with the failure of either tube however, the voltage drop across the resistance through which current is passing will be registered by the pointer to indicate that current is no longer passing through the other tube. In using this arrangement in my charging circuit or reactances of the character shown in Figure 14 comprising a coil 129 on core 130, the coil centrally tapped by the positive output lead 103, it is obviously desirable to either incorporate the types of indicating devices shown in Figures 4, 7 or 9 in the circuit as is shown in Figure 14, or if indicating devices of the character shown in Figures 8 and 10 are employed it is desirable to employ a reactance such as is shown in Figure 11 or reactances such as are shown in Figures 4 or 12.

In Figure 15 is shown a casing 123 for receiving my modified form of charger as shown in the circuits illustrated in Figures 4, 11, 12 and 13, having a face 124 for mounting the casing 112, ammeter 104, switch knob 54, and current supply switch 125.

The casing 112, as shown in Figure 6, is provided with bolts attached to the rear thereof for mounting and securing with nuts on the panel 124. The casing 123 has longitudinal members 126 fixed on the bottom, or other securing means for mounting on the top of the charging rack shown in my copending application, Serial No. 552,530.

The switch 125, as shown in Figures 10, 12 and 13, is adapted to control the alternating current input to the transformer. This switch may be eliminated from face piece 123, if so desired and operated jointly with the switch controlled by turning the knob 54.

The simplification of operation and efficiency of my charging apparatus is made possible by the use of my novel double switch. If separate switches are used for the rectifiers, an ammeter must be used in each tube circuit in order to allow for the control of the output of each, further requiring a nicety of adjustment. It is also necessary to employ a third switch for control of the alternating current, and a third ammeter if it is desired to register the total combined output of the tubes. It is further essential to employ an impedance in each tube circuit and no balancing action is obtained thereby. In fact, the efficiency of operation of a charger having a circuit of this character is dependent on the rectifiers having very similar operating characteristics.

I accomplish by my invention a rectification circuit in which by the use of my novel double switch I am able to provide for a single control of both tubes, the use of a single ammeter and a single novel meter for indicating the operation of both rectifiers and to employ a balancing reactance or reactances as is highly desirable, preferably of the novel character described consisting of two windings on magnetically associated cores.

While I have shown and described the preferred embodiments of my invention, I wish it to be understood that I do not confine myself to the precise details of constructions herein set forth by way of illustration, as it is apparent that many changes and variations may be made therein, by those skilled in the art without departing from the spirit of the invention, or exceeding the scope of the appended claims.

I claim:

1. A battery charger comprising a transformer having a primary winding adapted to be connected to a source of alternating current, a symmetrical pair of sets of tapped windings on the secondary of the transformer, the windings of one set being connected in series by a rectifying element adapted to rectify one half of the wave, the windings of the other set being connected in series by a second rectifying element adapted to rectify the other half of the wave, a switch having one set of contact points connected to one tapped winding of one set of windings, and a second set of contact points connected to a corresponding symmetrical winding of the other set of windings, a switch arm adapted to connect one contact point of each set with one of the other set and with one terminal of a battery to be charged, and a second switch for similarly connecting the other symmetrical winding of each set of windings to the other terminal of the battery to be charged.

2. A battery charger comprising a transformer having a primary winding adapted to be connected to a source of alternating current, a symmetrical pair of sets of tapped windings on the secondary of the transformer, the windings of one set being connected in series by a rectifying element adapted to rectify one-half of the wave, the windings of the other set being connected in series by a second rectifying element adapted to rectify the other half of the wave, a switch having one set of contact points connected to one tapped winding of one set of windings, and a second set of contact points connected to a corresponding symmetrical winding of the other set of windings, a switch arm adapted to connect one contact point of each set with one of the other set and with one terminal of a battery to be charged, a second switch for similarly connecting the other symmetrical winding of each set of windings to the other terminal of the battery to be charged, and a balancing reactance positioned in the circuit between one of the switches and the battery.

3. A rectification circuit comprising a source of alternating current, duplicate rectifying means, means simultaneously acting to control the current passed to the duplicate rectifying means, and a single means to simultaneously indicate the comparative operation of each of the rectifying means to show the comparative energy transmitted by the two circuits, each of which comprises a rectifying means.

4. A rectification circuit comprising a source of alternating current, duplicate rectifying means, means to control the current passed to the duplicate rectifying means, a single means to indicate the operation of each of the rectifying means, and means to register the total output of the rectifying means.

5. A rectification circuit comprising a source of alternating current, duplicate rectifying means, means to control the current passed to the duplicate rectifying means, an impedance in each of the circuits of the duplicate rectifying means, and a single means to differentially and simultaneously indicate the operation of each of the rectifying means to show the comparative energy transmitted by the two circuits, each of which comprises a rectifying means.

6. A rectification circuit comprising a source of alternating current, duplicate rectifying means, means to control the current passed to the duplicate rectifying means, reactances having a common core in the circuits of the duplicate rectifying means, and a single means to differentially and simultaneously indicate the operation of each of the rectifying means to show comparative energy transmitted by the two circuits, each of which comprises a rectifying means.

7. A rectification circuit comprising a source of alternating current, a plurality of rectifying tubes, unitary means for correspondingly varying the amount of current passed to the rectifiers, and a single means for differentially and simultaneously indicating the operation of both rectifying means to show comparative energy transmitted by the two circuits, each of which comprises a rectifying means.

8. A rectification circuit comprising a source of alternating current, duplicate rectifying means, unitary means for correspondingly varying the amount of current passed to the rectifiers, a reactance in each of the circuits of the rectifying means, the cores of the reactances being magnetically associated, and a single means for differentially and simultaneously indicating the operation of the rectifying means to show the comparative energy transmitted by the two circuits, each of which comprises a rectifying means.

9. A rectification circuit comprising a source of alternating current, a transformer having a primary coil connected to the source of current, a plurality of tapped secondary coils on the transformer, duplicate rectifying means connected thereto through means to correspondingly vary the number of turns on the tapped secondary coils, and a single means in the circuits of the duplicate rectifying means for differentially and simultaneously indicating the operation of each to show the comparative energy transmitted by the two circuits, each of which comprises a rectifying means.

10. A rectification circuit comprising a source of alternating current, a transformer connected thereto, a plurality of tapped coils on the transformer, duplicate rectifying means connected thereto through means to correspondingly vary the number of turns on the tapped secondary coils, a single means in the circuits of the duplicate rectifying means for indicating simultaneously and differentially the operation thereof, and a reactance in each of the circuits of the duplicate rectifying means, the cores thereof being common.

11. A rectification circuit comprising a source of alternating current, a transformer connected thereto, duplicate rectifying means connected thereto through a single means for correspondingly varying the amount of current passed to the rectifier, a single means responsive to the current in each of the circuits of the rectifying means to indicate simultaneously and differentially the operation of each, means in circuit with the rectifying means to register the output thereof and windings in each of the circuits of the rectifying means, having magnetically connected cores to provide balancing reactances.

12. A single device for indicating the operation of a plurality of rectifiers including means for interposing the same in the circuit of each rectifier and means responsive to the passage of current in the circuits to differentially and simultaneously indicate the operation of each.

13. A rectification circuit comprising a source of alternating current, a transformer connected thereto, rectifying means for each half of the alternating current pulsation, means for simultaneously regulating the amount of current supplied to the rectifying means for each half of the alternating current wave, a single means responsive to the current in each of the circuits of the rectifying means to indicate simultaneously the operation of each, means in circuit with the rectifying means to register the output thereof, and windings in each of the circuits of the rectifying means having magnetically connected cores to provide balancing reactances.

14. A rectification circuit comprising a source of alternating current, rectifying means for each half of the alternating current wave, means simultaneously acting to control the current passing to the rectifying means, and a single means to indicate simultaneously the comparative energy output of the rectifying means for each half of the alternating current wave.

15. A battery charging circuit of the character described comprising a source of alternating current, a transformer having a primary coil connected to said source of current, a plurality of tapped secondary coils on said transformer, said secondary coils being connected in groups of two and in series with bulb rectifiers, said groups of coils being connected in parallel with a series connected load and balancing reactance, and means for simultaneously and correspondingly varying the number of turns of the tapped secondary coils in all of the groups.

16. A battery charger comprising a transformer having a primary winding adapted to be connected to a source of alternating current, a symmetrical pair of sets of tapped windings on the secondary of the transformer, the windings of one set being connected in series by a rectifying element adapted to rectify one half of the wave, the windings of the other set being connected in series by a second rectifying element adapted to rectify the other half of the wave, a switch having one set of contact points connected to one tapped winding of one set of windings, and a second set of contact points connected to a corresponding symmetrical winding of the other set of windings, a switch arm adapted to connect one contact point of each set with one of the other set and with one terminal of a battery to be charged, and a second switch for similarly connecting the other symmetrical winding of each set of windings to the other terminal of the battery to be charged.

17. A battery charger comprising a transformer having a primary winding adapted to be connected to a source of alternating current, a symmetrical pair of sets of tapped windings on the secondary of the transformer, the windings of one set being connected in series by a rectifying element adapted to rectify one-half of the wave, the windings of the other set being connected in series by a second rectifying element adapted to rectify the other half of the wave, a switch having one set of contact points connected to one tapped winding of one set of windings, and a second set of contact points connected to a corresponding symmetrical winding of the other set of windings, a switch arm adapted to connect one contact point of each set with one of the other set and with one terminal of a battery to be charged, a second switch for similarly connecting the other symmetrical winding of each each set of windings to the other terminal of the battery to be charged, and a balancing reactance positioned in the circuit between one of the switches and the battery.

BENJAMIN F. W. HEYER.